US011721329B2

(12) United States Patent
Kumar et al.

(10) Patent No.: US 11,721,329 B2
(45) Date of Patent: Aug. 8, 2023

(54) METHOD, SYSTEM AND APPARATUS FOR MULTILINGUAL AND MULTIMODAL KEYWORD SEARCH IN A MIXLINGUAL SPEECH CORPUS

(71) Applicants: Indian Institute of Technology, Delhi, New Delhi (IN); Centre for Development of Telematics, New Delhi (IN)

(72) Inventors: Arun Kumar, New Delhi (IN); Abhimanyu Popli, New Delhi (IN)

(73) Assignees: Indian Institute of Technology, Delhi, New Delhi (IN); Centre for Development of Telematics, New Delhi (IN)

( * ) Notice: Subject to any disclaimer, the term of this patent is extended or adjusted under 35 U.S.C. 154(b) by 64 days.

(21) Appl. No.: 16/646,315

(22) PCT Filed: Sep. 10, 2018

(86) PCT No.: PCT/IB2018/056871
§ 371 (c)(1),
(2) Date: Mar. 11, 2020

(87) PCT Pub. No.: WO2019/049089
PCT Pub. Date: Mar. 14, 2019

(65) Prior Publication Data
US 2020/0273449 A1      Aug. 27, 2020

(30) Foreign Application Priority Data
Sep. 11, 2017   (IN) .............................. 201711032030

(51) Int. Cl.
*G10L 15/187*      (2013.01)
*G06F 16/33*       (2019.01)
(Continued)

(52) U.S. Cl.
CPC ...... *G10L 15/187* (2013.01); *G06F 16/24522* (2019.01); *G06F 16/3337* (2019.01);
(Continued)

(58) Field of Classification Search
CPC .. G06F 16/24522; G06F 16/60; G06F 16/635; G10L 15/183; G10L 15/08; G10L 2015/088; G10L 15/187
See application file for complete search history.

(56) References Cited

U.S. PATENT DOCUMENTS 6,999,932 B1 * 2/2006 Zhou ................... G06F 16/3337
704/277
2003/0204492 A1 * 10/2003 Wolf ................... G06F 16/3343
(Continued)

FOREIGN PATENT DOCUMENTS

JP    2009237755 A    10/2009
WO   2008067562 A2    5/2008

OTHER PUBLICATIONS

Mantena et al., "Use of articulatory bottle-neck features for query-by-example spoken term detection in low resource scenarios." 2014 IEEE International Conference on Acoustics, Speech and Signal Processing (ICASSP). IEEE, 2014) in view of Ajmera et al. (US PGPub 2013/0007035 (Year: 2013).*
(Continued)

*Primary Examiner* — Samuel G Neway
(74) *Attorney, Agent, or Firm* — Volpe Koenig (57) ABSTRACT

In the present invention, a method for searching multilingual keywords in mixlingual speech corpus is proposed. This method is capable of searching audio as well as text keywords. The capability of audio search enables it to search out-of-vocabulary (OOV) words. The capability of searching text keywords enables it to perform semantic search. An advanced application of searching keyword translations in
(Continued)

mixlingual speech corpus is also possible within posteriorgram framework with this system. Also, a technique for combining information from text and audio keywords is given which further enhances the search performance. This system is based on multiple posteriorgrams based on articulatory classes trained with multiple languages.

3 Claims, 7 Drawing Sheets

(51) Int. Cl.
    *G06F 16/35*     (2019.01)
    *G10L 15/02*     (2006.01)
    *G10L 15/22*     (2006.01)
    *G10L 15/183*     (2013.01)
    *G06F 16/60*     (2019.01)
    *G06F 16/2452*     (2019.01)
    *G06F 16/635*     (2019.01)
    *G10L 15/08*     (2006.01)

(52) U.S. Cl.
    CPC ........ *G06F 16/3344* (2019.01); *G06F 16/353* (2019.01); *G06F 16/60* (2019.01); *G06F 16/635* (2019.01); *G10L 15/02* (2013.01); *G10L 15/08* (2013.01); *G10L 15/183* (2013.01); *G10L 15/22* (2013.01); *G10L 2015/025* (2013.01); *G10L 2015/088* (2013.01)

(56) References Cited

U.S. PATENT DOCUMENTS

| | | | |
|---|---|---|---|
| 2009/0157383 A1* | 6/2009 | Cho | G06F 16/332 704/8 |
| 2011/0218805 A1* | 9/2011 | Washio | G10L 15/00 704/251 |
| 2013/0007035 A1* | 1/2013 | Ajmera | G06F 16/632 707/769 |
| 2014/0278390 A1* | 9/2014 | Kingsbury | G10L 25/54 704/232 |
| 2015/0255060 A1* | 9/2015 | Tomita | G10L 15/02 704/254 |
| 2020/0273449 A1* | 8/2020 | Kumar | G06F 16/353 |

OTHER PUBLICATIONS

Prabhavalkar et al., "Discriminative articulatory models for spoken term detection in low-resource conversational settings." 2013 IEEE International Conference on Acoustics, Speech and Signal Processing. IEEE, 2013 (Year: 2013).*

Popli et al., "Query-by-example spoken term detection using low dimensional posteriorgrams motivated by articulatory classes." 2015 IEEE 17th international workshop on multimedia signal processing (MMSP). IEEE, 2015 (Year: 2015).*

Buzo et al., "Multilingual query by example spoken term detection for under-resourced languages," 2013 7th Conference on Speech Technology and Human-Computer Dialogue (SpeD) (Year: 2013).*

* cited by examiner

Subclasses of the class vowel-like phonemes front upper, front bottom, back bottom, back middle, back upper, phoneme /ey/, phoneme /eh/, schwa vowel (cen), phoneme /w/, phoneme /y/, lateral, rhotics, aspiration, approximant, diphthong /ay/), diphthong /aw/, diphthong, not-a-vowel.

Subclasses of the class place of articulation of consonants velar stops, retroflex stops, palatal stops, palatal fricatives, dental stops, dental fricatives, labial stops, labiodental fricatives, glottal, silence, rej (reject all vowels)

Subclasses of the class manner of articulation of consonants vowel-like, voiced stops, unvoiced stops, voiced fricatives, unvoiced fricatives, nasals, silence

| Keyword type | DTW cost measure | English | Bangla | Hindi | Telugu |
|---|---|---|---|---|---|
| Spoken | KL distance | 71.97 | 51.89 | 64.36 | 42.19 |
| Text | Dot product measure | 71.61 | 62.10 | 61.24 | 31.32 |
| Combined | KL distance | 80.78 | 56.48 | 65.55 | 46.34 |

FIGURE 10

METHOD, SYSTEM AND APPARATUS FOR MULTILINGUAL AND MULTIMODAL KEYWORD SEARCH IN A MIXLINGUAL SPEECH CORPUS

CROSS REFERENCE TO RELATED APPLICATIONS

This application is a 35 USC § 371 national stage of International Application No. PCT/IB2018/056871, which was filed Sep. 10, 2018 and claims the benefit of IN Patent Application No. 201711032030, filed Sep. 11, 2017, both of which are incorporated herein by reference as if fully set forth.

TECHNICAL FIELD

The present subject matter described herein, in general, relates to a process of searching audio or text keyword in a speech corpus. More particularly, the invention relates to a method and system for searching an in-vocabulary or out of vocabulary multilingual keyword in a monolingual or multilingual or mixlingual speech corpus or running speech. The mixlingual speech refers to multilingual speech which is not tagged by language ids. One popular way of searching audio keywords is by representing speech corpus and the audio keywords by phonemic or Gaussian posteriorgrams. The present subject matter is based on representation of multilingual speech and text as articulatory information for searching audio and text keywords.

BACKGROUND OF THE INVENTION

The term posteriorgram and the audio keyword search process based on posteriorgrams are explained as follows.

A posterior vector corresponding to a speech frame is defined as a vector of posterior probabilities. For example, the phonemic posterior vector is a vector of posterior probabilities of phonemes. The Gaussian Mixture Model (GMM) posterior vector is a vector of posterior probabilities of the constituent Gaussians. A set of posterior vectors corresponding to multiple speech frames is known as a posteriorgram. A posteriorgram corresponding to a speech utterance can be extracted using phoneme recognizer in case of phonemes and a pre-estimated GMM in case of GMM. The posteriorgrams of a audio keyword and speech utterance are then matched using Dynamic Time Warping (DTW).

Lattice based keyword search is commonly used for searching text keyword in speech corpus. Lattices of speech are commonly generated by Hidden Markov Models (HMMs) or Deep Neural Networks (DNN).

The limitation of audio keyword search is that the keyword search is limited to the audio keyword only and similar meaning words from the dictionary cannot be searched. This limitation can be overcome by text keyword search as the similar meaning words or translations of a text keyword can be derived from a language dictionary and searched. However, the limitation of the text search is that only the phonemes of training language can be searched in the test speech.

For some existing prior arts reference is made to "*Query-by-Example Spoken Term Detection on Multilingual Unconstrained Speech*", Xavier Anguera, Luis J. Rodriguez-Fuentes, Igor Szoke, Andi Buzo, Florian Metze, and Mikel Penagarikano. This document describes the objective of Spoken Web Search (SWS) challenge "The 2013 Spoken Web Search Task". It is only about spoken or audio queries and not text queries. The approach is also based on phonemes which are language dependent.

Reference is further made to document, "*Search Engine for Multilingual Audiovisual Contents*", José David Pérez, Antonio Bonafonte, Antonio Cardenal, Marta Ruiz, José A. R. Fonollosa, Asuncion Moreno, Eva Navas, Eduardo R. Banga. This paper describes the BUCEADOR search engine, a web server that allows retrieving multimedia documents (text, audio, and video) in different languages. All the documents are translated into the user language and are presented either as text (for instance, subtitles in video documents) or dubbed audio. The user query consist in a sequence of keywords and can be typed or spoken. Multiple Spoken Language Technologies (SLT) servers have been implemented, such as speech recognition, speech machine translation and text-to-speech conversion. The platform can be used in the four Spanish official (Spanish, Basque, Catalan and Galician) and in English. This system uses language specific decoders. The 'diarization' process mentioned in this document segregates the speech into different languages. Language specific decoders shall not give results for out of vocabulary words and indicate that there is a restriction on languages. Further, this system converts the speech into text and searches text in the text which is an obvious way to look at the problem. The system does not mention about combining text and audio queries which are also the crucial components the proposed process.

Reference is also made to document, "Keyword Spotting: An Audio Mining Technique in Speech Processing—A Survey", Dr. E. Chandra, K. A. Senthildev. This document presents a survey of techniques on audio mining, audio term detection and keyword spotting. It does not talk about multilingual or mixlingual environments or translations of keywords. Also, it does not refer to any article which describes a multilingual system.

Reference is also made to document, "Spoken keyword detection using autoassociative neural networks", S. Jothilakshmi. This paper is concerned with the use of the distribution capturing ability of the Auto associative neural network (AANN) for spoken keyword detection. It involves sliding a frame-based keyword template along the speech signal and using confidence score obtained from the normalized squared error of AANN to efficiently search for a match. This work formulates a new spoken keyword detection algorithm. It talks about spoken keyword and not about text queries or queries of both types. It does not consider multilingual or mixlingual environments.

Reference is also made to document, "A System Architecture for Multilingual Spoken Document Retrieval", Michal Chmulik, Peter Pocta. This system is restricted to three languages. It uses Automatic Speech Recognition (ASR) engines of three languages. It employs a language recognition module and then uses the ASR or the respective language. Since it is text search in text generated by an ASR, it may not be able to search out-of-vocabulary words. Also, it is language restricted. Further it does not mention about articulatory classes and no mention about combining text and audio queries.

Reference is further made to a patent document, U.S. Pat. No. 9,460,711 B1, entitled, "Multilingual, acoustic deep neural networks". This document discloses methods and systems for processing multilingual DNN acoustic models are described. An example method includes receiving training data that includes a respective training data set for each of two or more languages. A multilingual deep neural network (DNN) acoustic model may be processed based on the training data. The multilingual DNN acoustic model may include a feedforward neural network having multiple layers of one or more nodes. Each node of a given layer may connect with a respective weight to each node of a subsequent layer, and the multiple layers of one or more nodes may include one or more shared hidden layers of nodes and a language-specific output layer of nodes corresponding to each of the two or more languages. Additionally, weights associated with the multiple layers of one or more nodes of the processed multilingual DNN acoustic model may be stored in a database. This patent is about "multilingual DNN acoustic models" which are further connected with language specific output layers. This method is not suitable for mixlingual scenarios where multiple unknown languages are expected and their language identification tags are not given. Language dependent text queries cannot be searched by use of language independent acoustic models.

Although some methods and systems exist for searching multilingual keywords in multiple languages. But no method exists which allows searching of the speech and text queries or the combination of both at the same time. Also no method takes into account the multilingual or mixlingual environments or translations of keywords. Most of the approaches are based on phonemes which are language dependent. No document discloses the articulatory classes based approach to search a multilingual queries (text, audio or combination of both) in mixlingual speech.

Accordingly, there is a dire need for an improved method for searching a keyword belonging to a known or an unknown language in a monolingual or multilingual or mixlingual speech corpus or running speech, where keyword can be presented in audio mode, text mode or combined mode of audio and text keywords.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

An objective of the present invention is to provide a method, system and apparatus for searching multilingual or monolingual text queries or speech queries or queries comprising a combination of both and belonging to a known or an unknown language in a monolingual or multilingual or mixlingual speech corpus or running speech. The language(s) of the running speech or speech corpus are unknown.

Another objective of the present invention is to provide a method and system for searching of translations of queries in mixlingual speech corpus.

Accordingly, in one aspect, in one implementation, the present invention provides a method for performing at least a multimodal keyword data search by using an electronic device, the method comprising the steps of:
 inputting said keyword data, wherein said keyword includes plurality of multilingual text keywords and/or audio keywords;
 converting said input keyword data to obtain plurality of articulatory classes and subclasses information, wherein said device includes a multilingual speech-based storage system having a plurality of records of information associated with said articulatory classes and subclasses;
 matching, said articulatory classes and subclasses information obtained from said input keyword data with said plurality of records to obtain a result.

In one implementation, the electronic device is selected from a client device or a server device or any combinations thereof.

In one implementation, inputting, by using the client device, said keyword wherein said keyword includes plurality of multilingual texts keywords and/or audio keywords, comprises:
 Inputting at least an audio keyword through a recording device; or
 Inputting at least a multilingual test keyword through a peripheral device; or
 Inputting a combination of at least a audio keyword and a corresponding text keyword(s). The text keyword(s) are the text version of the audio keyword(s).

In one implementation, before converting said input keyword to obtain plurality of articulatory information, pre-training, the electronic device to detect articulatory classes and subclasses information associated with said input keyword.

In one implementation, converting, by using the electronic device, said multilingual text keywords into a sequence of phonemes, and further converting said sequence of phonemes into information associated with said articulatory classes and subclasses.

In one implementation, converting said keyword to obtain said plurality of articulatory information, comprises:
 converting, by using the electronic device, said plurality of keywords into a sequence of phonemes;
 converting the sequence of phonemes into information associated with articulatory classes and subclasses; and thereby
 combining the information associated with articulatory classes and subclasses of said multilingual texts and audio keywords to perform matching.

In one implementation, matching, said articulatory information from said keyword with said recorded data to obtain said result, comprises: matching, said articulatory classes and subclasses information obtained from said input keyword with said articulatory classes and subclasses information pre-recorded in said multilingual speech-based storage system.

In one aspect, in another implementation, the present invention provides a system to perform at least a multimodal keyword data search, wherein the system comprising a client device, and a server device communicably coupled to said client device;
 wherein said client device comprises:
  an input receiving device, adapted to receive at least an input corresponding to said keyword includes plurality of multilingual text keywords and/or audio keywords;
 wherein said server device comprises:
  conversion modules, adapted to: convert said keyword received from said client device to obtain plurality of articulatory information; and convert audio data having multilingual speech recording into a plurality of records having data associated with articulatory classes and sub-classes information;
  a multilingual speech-based storage system recording said plurality of records having data associated with articulatory classes and sub-classes information;

a processor module, adapted to perform matching of articulatory information associated with said keyword with said plurality of records to generate a result.

In one aspect, in another implementation, said client device further comprises a conversion module, adapted to convert said input keyword data received to obtain plurality of articulatory information.

Accordingly, in the present invention a framework for searching a keyword belonging to a known or an unknown language in a monolingual or multilingual or mixlingual speech corpus or running speech is proposed. The method is also applicable in the scenarios where the language(s) of the running speech or speech corpus are unknown. The keyword to be searched in the test speech corpus or running speech can be presented in three modes. The three modes of presenting the keyword are audio mode, text mode and combined mode of audio and text keywords. It is possible to search non-dictionary text keywords using this method. The method also has a provision to search translations of keywords in speech corpus or running speech which may consist of a mixture of unknown languages. The method gives a unique representation to phonemes of multiple languages so that text keywords of multiple languages can be searched in a mixlingual speech corpus.

Briefly, the present process gives a unique language independent representation to phonemes of multiple languages so that text keywords of multiple languages can be searched in a mixlingual speech corpus.

This process also makes it possible to combine the information from audio keywords and text keywords leading to an enhancement. The combination of the audio keyword and the corresponding text keyword has higher performance in the non-training languages. Further, this system does not assume any language identification tags in the speech data or corpus for searching text queries and therefore it can give a better performance where language identification tags of speech data are not given.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE ACCOMPANYING DRAWINGS

The above and other aspects, features, and advantages of certain exemplary embodiments of the present invention will be more apparent from the following description taken in conjunction with the accompanying drawings in which:

FIG. 7 shows (a) phonemes of English word mapped to articulatory subclass, (b) phonemes of translation of English word mapped to articulatory subclass, according to one embodiment of present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF THE PRESENT INVENTION

The following description with reference to the accompanying drawings is provided to assist in a comprehensive understanding of exemplary embodiments of the invention. It includes various specific details to assist in that understanding but these are to be regarded as merely exemplary.

Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

In the present invention, the client device and the server device may or may not be hosted on the same machine. In other words, the client device can be host device while the server device can be a remote device. However, in various embodiments, the client device can also act as a server device and the server device can also act as a client device.

This invention focuses on the process of searching a keyword belonging to a known or an unknown language in a monolingual or multilingual speech corpus. It enables a keyword search where in the keyword to be searched in the test speech corpus can be presented in three modes. The three modes of presenting the keyword are audio mode, text mode and combined mode of audio and text keywords. The audio keywords further encompass spoken keywords. It is possible to search non-dictionary text keywords using this process. This process also has a provision to search translations of keywords since it is based on unique representation of phonemes of multiple languages. This invention may also be used to index a multilingual or mixlingual speech corpus.

In one implementation, the method is based on articulatory classes and subclasses. The speech corpus to be searched is represented in terms of articulatory subclasses. The articulatory subclasses refer to the classes of phonemes that are based on the configuration of articulators of speech production. Speech frames of audio queries and test speech can be represented in terms of articulatory subclasses by classifiers similar but not limited to neural networks or by use of algorithms designed for detecting articulatory properties. The multilingual text keywords can be first converted into a sequence of phonemes by phoneme dictionary or grapheme to phoneme convertors of that language. Some languages, that includes but not limited to Hindi, have a unique grapheme to phoneme mapping. This phoneme sequence can be converted into the developed articulatory subclasses based on the speech production mechanism of the phoneme. The synonyms and translations of text keywords can be obtained from language dictionaries. These translations and synonyms can also be converted into articulatory subclasses in the same way as the original text keywords. Since both text keywords and audio keywords can be represented in terms of articulatory subclasses, they can be combined to enhance the representation of keywords if both audio keyword and text keyword are available. The audio keyword can also be derived from test speech corpus using text keyword if it is available in the test speech corpus. In that case the user is not required to speak the keyword. The combination of audio keyword from the speech corpus and the text keyword can also be used to find other occurrences of the audio keyword in the corpus. The articulatory subclasses based representations of each of the three modes of keywords (audio, text and combined) can be individually matched to articulatory subclass based representation of the speech corpus to search the keywords in the speech corpus.

In the present invention a keyword belonging to a known or an unknown language in a monolingual or multilingual or mixlingual speech corpus or running speech can be searched. The system is also applicable in the scenarios where the language(s) of the running speech or speech corpus are unknown. The keyword to be searched in the test speech corpus or running speech can be presented in three modes viz. audio mode, text mode and combined mode of audio and text keywords. It is possible to search non-dictionary text keywords using this process. The system may comprise of a text entering device, a recording device, a processor and a memory. The system may also contain other hardware like a display screen to display results or an apparatus to select input modes. The system is also capable of searching translations of text keyword in multiple languages in a speech corpus consisting of mixture of unknown and multiple languages.

Figure 1:
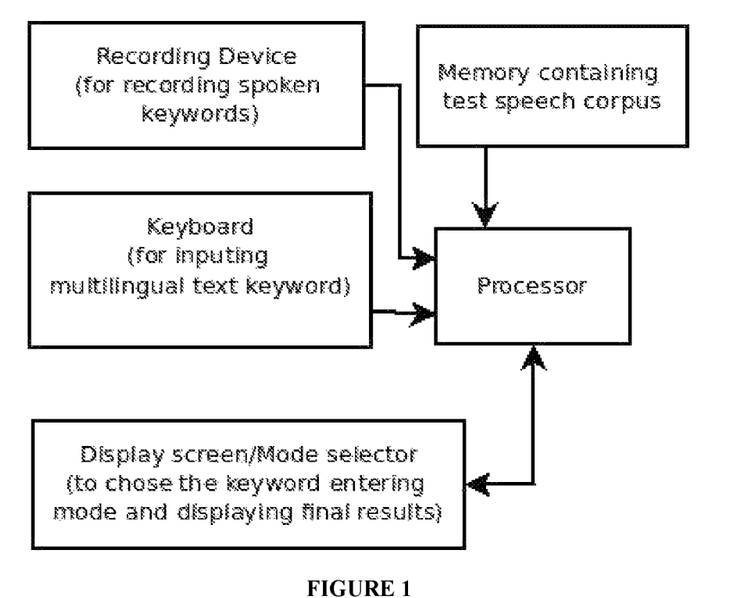
FIG. 1 shows the main hardware components involved in the process of multimodal keyword search, according to an embodiment of present invention.

In one implementation, the main hardware components involved in the process of multimodal keyword search are shown in FIG. 1. The user can select a mode of searching the keyword through a display screen on the client device. The keyword can be entered through three modes viz. audio, text or combined. The audio keyword is entered through a recording device in case of audio keyword. The text keyword is entered through a keyboard or a similar device in case of text keyword. The system also supports a combined mode where both audio keyword and text keyword can be combined. Memory is required to store the instructions required to execute the method, speech corpus and intermediate values during processing. A processor is needed to carry out the search as explained in the later sections.

Figure 2:
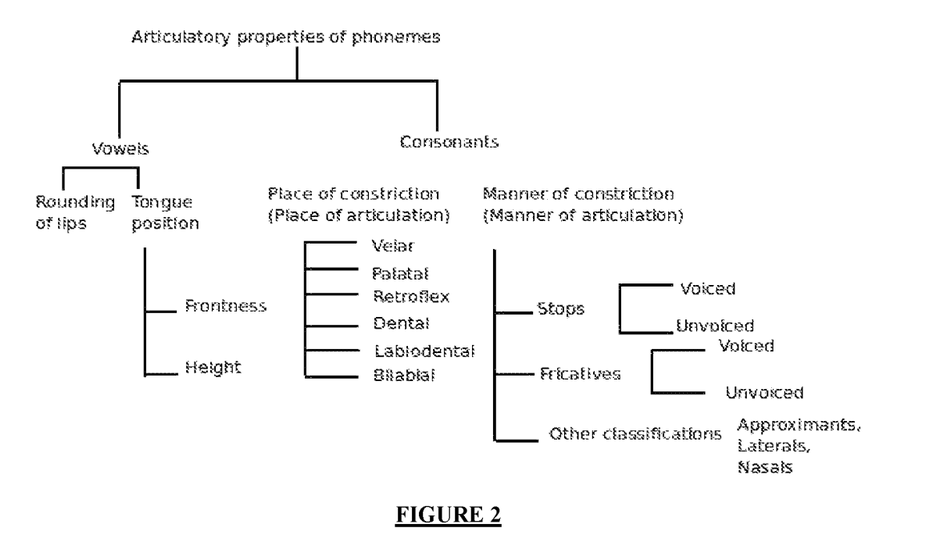
FIG. 2 shows the classification of phonemes based on articulatory properties, according to one embodiment of the present invention.

In one implementation, the classification of phonemes based on their articulatory properties is given in FIG. 2. Phonemes are first classified as vowels and consonants and then they are classified on the basis of their articulatory properties. The articulatory classes used in this work are vowel like, place of articulation of consonants and manner of articulation of consonants. The term articulator refers to the organs of human speech production system that includes but not limited to tongue, lips, teeth, and the like. Articulatory classes of phonemes are based on the position of articulators and the manner in which articulators work for speech production. For example, the phonemes produced with relatively more voicing and relatively less constriction are referred to as vowels. The rest of the phonemes which are articulated with relatively more constriction in the vocal tract are referred to as consonants. Vowels and consonants are classified by different articulatory properties as shown in the figure.

Vowels are mainly classified by frontness of tongue or height of the tongue (closeness of the tongue with the roof of the mouth). Some vowels are also characterized by rounded lips. Diphthongs are articulated by pronouncing two vowels consequently. Therefore, they cannot be described by a single configuration of tongue positions.

Figure 3:
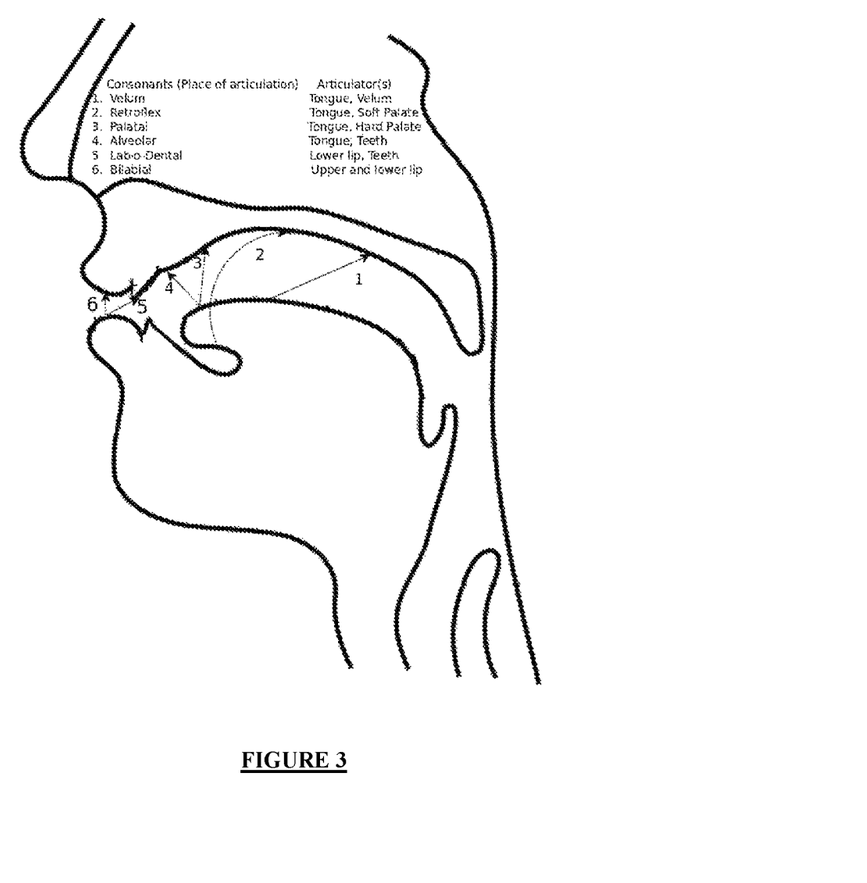
FIG. 3 shows place of articulation (place of constriction in the vocal tract) of consonants and articulators, according to one embodiment of the present invention.

In one implementation, the places of classification of consonants are explained with FIG. 3. The consonants can be classified by mainly two articulatory properties viz. place of articulation and manner of articulation. Place of articulation of consonants refers to the place of constriction in the vocal tract as shown in FIG. 3. The manner of articulation refers to the presence of voicing and the manner of constriction in case of consonants. The term voicing refers to the vibration of vocal chords. In case of stop phonemes the airflow is completely blocked. It is followed by a burst. In contrast, the airflow is made to pass through a narrow channel in case of fricatives. Stops can be further classified as voiced stops or unvoiced stops based on the timing of the start of voicing. Some voiced phonemes like approximants, rhotics and laterals are produced by unique positions of articulators and cannot be classified under the broad classifications of stops and fricatives.

Figure 4:
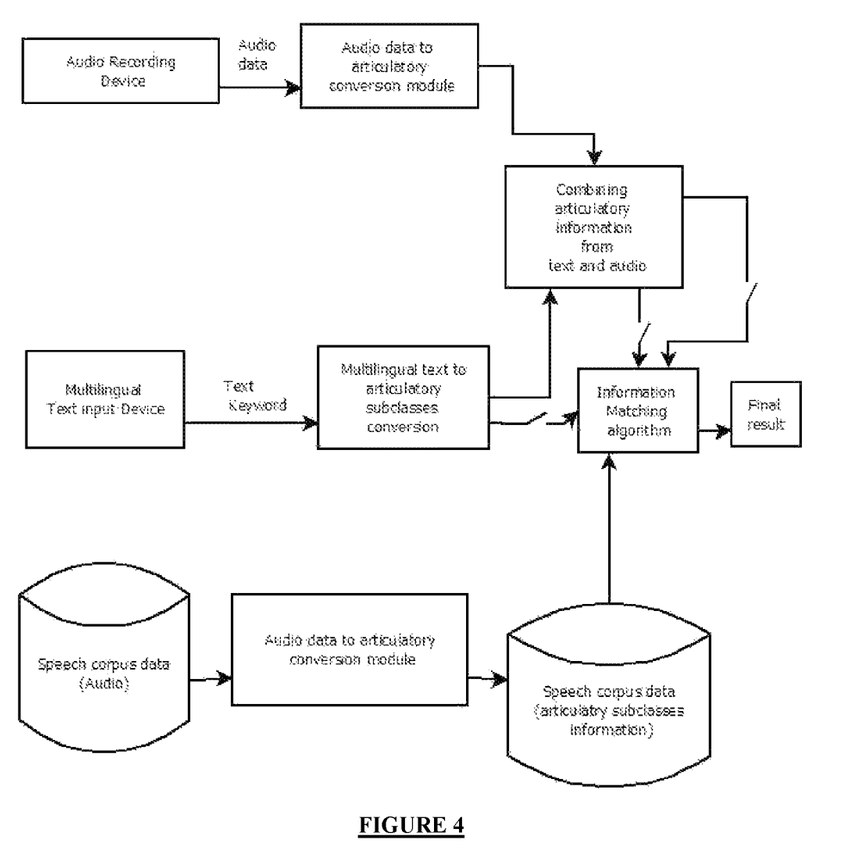
FIG. 4 shows framework of Multimodal keyword search, according to the present invention.

In one implementation, FIG. 4 shows the framework of keyword search. This figure shows the process of keyword search for all the three modes. The user can input the keyword in audio form or text form or both. A recording device is used to input a audio keyword. A multilingual keyboard is used to input multilingual text keyword. The figure shows the blocks to convert audio data into articulatory subclasses information, convert text keyword into articulatory subclasses. The figure also shows a block to combine audio version and a text version of the same keyword.

Figure 6:
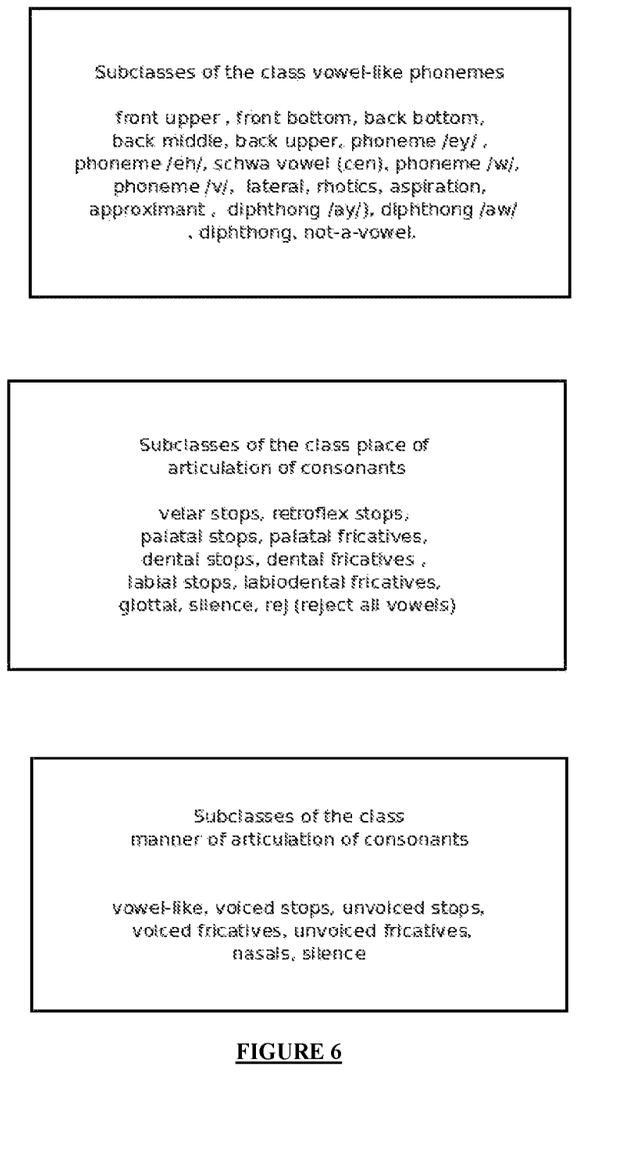
FIG. 6 shows the articulatory classes and subclasses, according to one embodiment of present invention.
Figure 7:
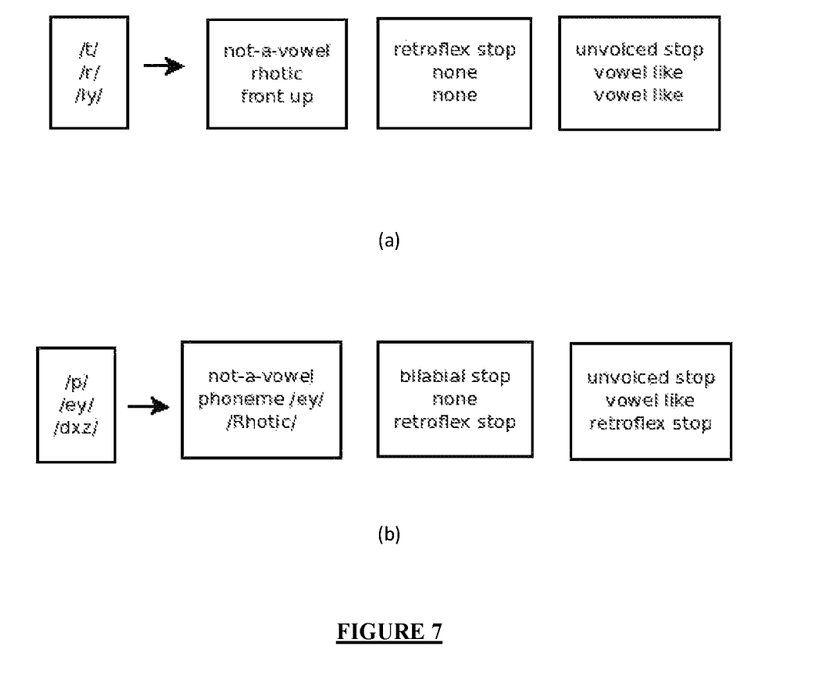

In one implementation, the representation based on articulatory subclasses requires assignment of phonemes to articulatory subclasses. Phoneme sets of four languages, English, Bengali, Hindi and Telugu were assigned articulatory subclasses of three classes. This assignment is developed as per FIG. 6. This kind of assignment can also be used for converting multilingual text keywords to articulatory subclasses. An example of this process for a Hindi keyword and an English keyword is shown in FIG. 7. This assignment is derived from the design principle that number of articulatory classes should be kept minimal. Most of the vowel-like phonemes are assigned a single subclass each as the articulatory properties of vowels are dynamic within single phonemes. One class of articulatory classes represents vowel-like phonemes whereas the other two classes represent articulatory properties of the consonants viz. place of articulation and manner of articulation.

In the implementation, the audio keywords and speech corpus data of these four languages were converted into three articulatory posteriorgrams based on three articulatory classes. This was accomplished using pre-trained single hidden layer (3000 neurons) based Multi-Layer Perceptrons. MFCC coefficients together with their first and second derivatives were used as acoustic features.

In one implementation, the recording device as shown in FIG. 4 records the audio samples in audio file formats such as .wav, .amr or any other format. The multilingual keyboard shown in FIG. 4 can be used to input multilingual text keywords. The text interface can be a keyboard similar to but not restricted to a smart phone keyboard or a desktop keyboard. The keyboard may be a multilingual keyboard which supports multilingual keywords in encodings similar but not restricted to UTF-8 and UTF-16. In an exemplary implementation, audio and text keywords of four languages (English, Bengali, Hindi and Telugu) were used for validation.

Figure 5:
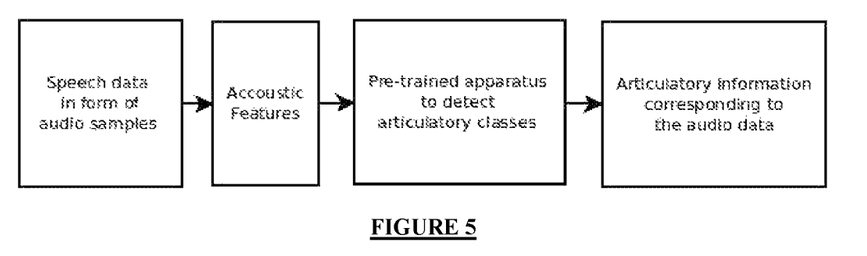
FIG. 5 shows block diagram of the process used for converting audio data to articulatory subclasses information from speech, according to one embodiment of present invention.

In one implementation, the block used for converting audio data to articulatory information is explained in FIG. 5. The audio keywords are processed by this audio to articulatory information conversion block as shown in FIG. 5. The process described in this block needs pre-trained apparatus which have been trained using multilingual data. The multilingual training is achieved by training with multilingual speech corpus and articulatory subclasses. The training of apparatus using multilingual speech corpus and articulatory subclasses based labels is further shown in FIG. 8.

As shown in FIG. 5, the audio keyword is converted to any of the acoustic features similar to but not restricted to Mel Frequency Cepstral Coefficients (MFCC) or Linear Prediction Coefficients (LPC). These acoustic features are used to derive articulatory subclasses by classifiers which can be based on multilayer or single layer neural network architectures, HMMs or algorithms to detect articulatory properties like place of articulation. The speech corpus is also converted to its articulatory subclasses based representation the same way. The multilingual text keywords can be converted to a phoneme sequence based on their pronunciation. The phoneme sequence can be converted to articulatory subclasses as per their speech production phenomenon of individual phonemes.

Figure 8:
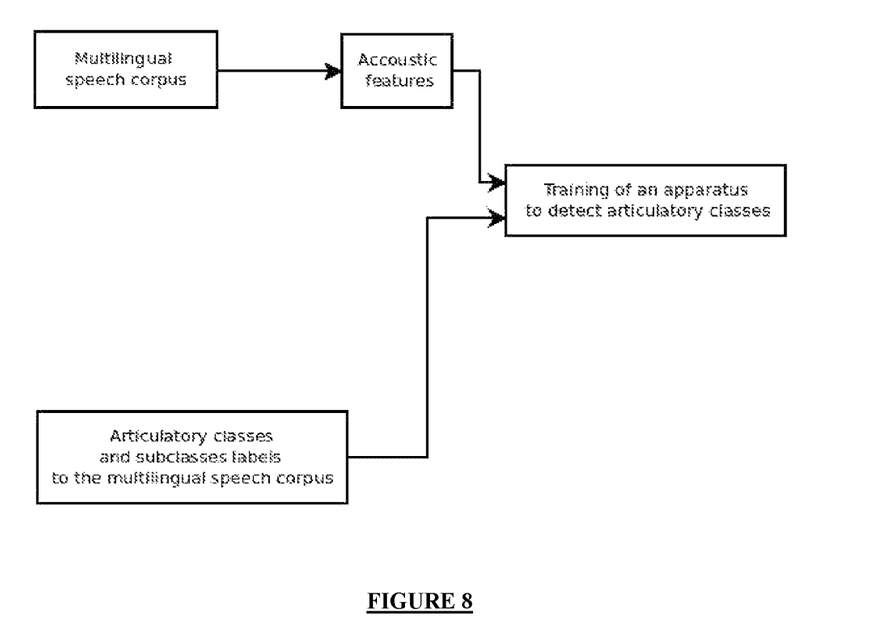
FIG. 8 shows the process flow chart of training for the detection of articulatory classes and subclasses, according to one embodiment of present invention.

In one implementation, training and tuning of classifiers can be done as per FIG. 8. Acoustic features can be derived from audio data of articulatory classes as described in the previous step. Prior knowledge of the articulatory subclasses are required to train a classifier. This can be done by assigning articulatory subclasses to each phoneme based on the speech production phenomenon of the phoneme.

In the implementation, the training of apparatus using multilingual speech corpus and articulatory subclasses based labels is shown in figure. 8. The generic process shown in FIG. 8 can be validated in the following manner. The time-aligned phoneme labels of the English and the Bengali training speech corpus were assigned articulatory subclass labels. Three Multi-Layer Perceptrons (MLPs) were trained using the articulatory subclasses labels and acoustic data of English first. The three MLPs were then retrained with acoustic data of English and Bengali with their corresponding time aligned labels.

Figure 9:
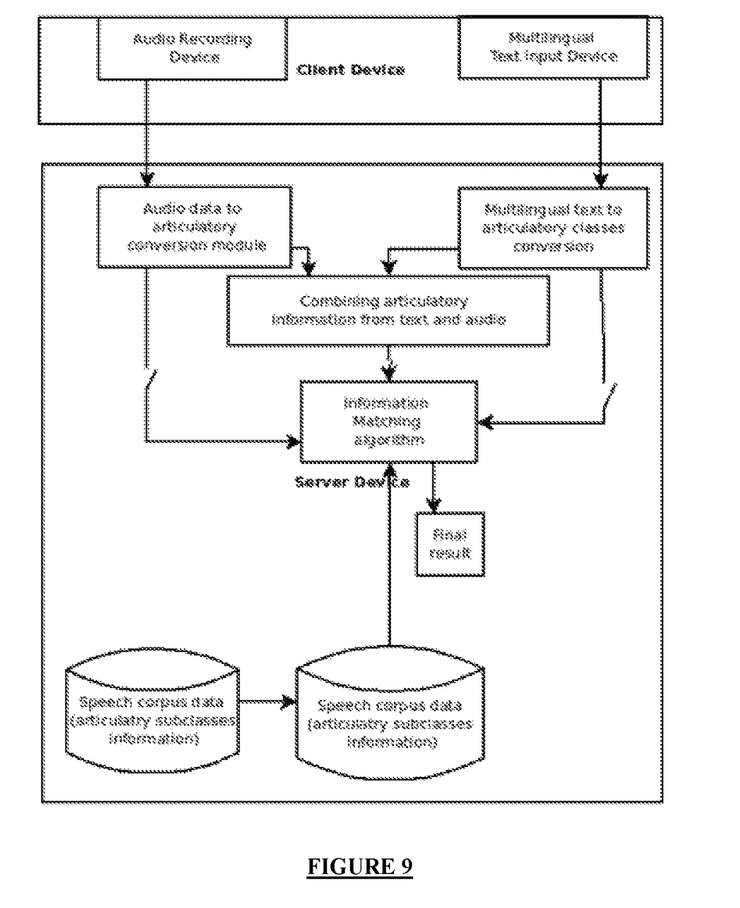
FIG. 9 shows the client and server model for multimodal keyword search, according to one embodiment of present invention.

In one implementation, the complete process of multimodal keyword search can be implemented as a client and a server model is shown in FIG. 9.

In one implementation, the articulatory subclasses information derived from audio terms can be matched with the articulatory subclasses information of the speech corpus to get the P@N score in the following manner. All the utterances are sorted and ranked by their similarity to the searched keyword. The proportion of top 'N' utterances which are relevant is defined as P@N if the total number of relevant utterances in the set of utterances 'N'. The posteriorgrams of audio keywords and test speech corpus can be matched using Dynamic Time Warping (DTW) algorithm. All the utterances in the test speech corpus can be ranked by their scores returned by DTW and average P@N of all audio keywords was evaluated. The articulatory subclasses information obtained from the texts keyword can be matched with the articulatory subclasses information of the speech corpus.

In one exemplary implementation, for validation, the text keywords of all languages were converted to articulatory subclasses of the three classes. These articulatory subclasses were expanded into three posteriorgrams corresponding to the three classes described earlier by assigning a fixed number of time frames to each phoneme. A probability of 1 was assigned to the subclasses which were valid (actually present) and 0 for subclasses which are invalid (not present). The zeros in the posteriorgram were replaced by small positive random numbers. The posteriorgrams were normalized so that every posterior vector sums up to 1. The posteriorgrams corresponding to text keywords were matched with the posteriorgrams of the test speech corpus generated earlier by DTW. All the utterances in the test speech corpus were ranked by their scores returned by DTW and average P@N of all text keywords was evaluated.

In one implementation, when audio version and the text version of the same keyword are available, their information can be combined as shown in FIG. 4 to improve keyword search results when compared to audio keyword search alone. The combining is done in the following manner in case of posteriorgrams. Both the text keyword posteriorgrams and audio keyword posteriorgrams obtained for validation contained the information of articulatory subclasses. The posteriorgrams corresponding to the same audio and text keywords can be aligned by DTW and added to get a new posteriorgram. This new posteriorgram shall be referred to as combined posteriorgram. The combined posteriorgram can be matched with the posteriorgrams of the test speech corpus. All the utterances in the test speech corpus can be ranked by their scores returned by DTW and average P@N of all combined posteriorgrams was evaluated.

Figure 10:
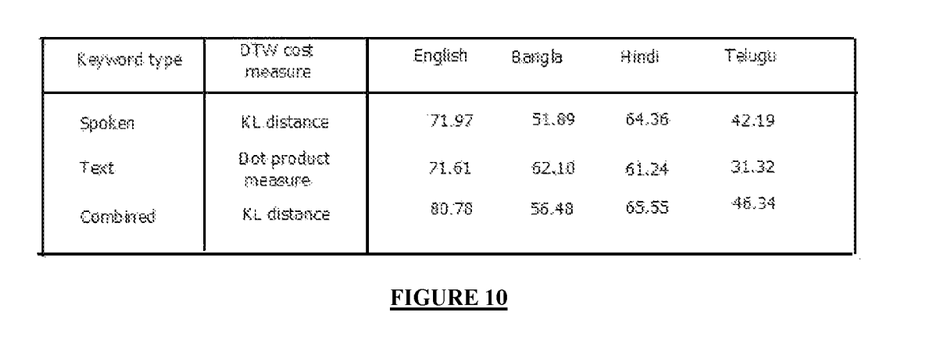
FIG. 10 shows the result (average P@N in percentage) of keyword search experiment, according to one embodiment of present invention.

In one implementation, the DTW algorithm uses a distance measure to compute distance between two posterior vectors. The probability distribution in a posterior vector of a text keyword posteriorgram is concentrated for the articulatory subclass which is actually present while the probabilities are more distributed in a posterior vector of a audio keyword posteriorgram. Evaluation shows that the distance measure based on the Dot product is better than the symmetric KL distance (Kullback-Leibler distance) for matching text keyword posteriorgrams. The symmetric KL distance (Kullback-Leibler distance) is better than the Dot product based measure for audio keyword posteriorgram and the combined posteriorgram. The results to validate this process are presented in FIG. 10. The average P@N for the keywords of the four languages are compared in FIG. 10. The best distance measure is used for each mode.

In one implementation, the keyword search process can be employed on the same device. It can also be split on two devices. The client machine may be used to for small processing tasks similar but not restricted to recording audio keyword and inputting text keyword. The tasks requiring high processing can be done at one or more servers. This kind of arrangement is shown in FIG. 9.

Some of the noteworthy features of the present invention:
1. A system comprising of a text entering device, a recording device, a processor and a memory for the purpose of searching text or speech queries in speech corpus or running speech comprising of mixture of unknown languages or a single language is claimed. The system may also contain other hardware like a display screen to display results or apparatus to select input modes. The components of the system like recording device, text entering device, processor and memory can be integrated in a system. They can also be used as interconnected hardware.
2. A system comprising of text entering device, a processor and memory which can search translations of text keyword in multiple languages in a speech corpus consisting of mixture of unknown and multiple languages is claimed. The keyword which is to be searched may be meaningful or arbitrary text which can be converted into phonemes. The system may also contain other hardware like a display screen to display results or apparatus to select input modes.
3. A process for searching a meaningful or an arbitrary multilingual text keyword in speech corpus or running speech is claimed which is specifically applicable in the scenarios where the language(s) of the running speech or speech corpus are unknown. This is done by converting the text into phonemes and then converting phonemes into articulatory classes and subclasses.
4. A process to search translations of text in speech corpus or running speech which may consist of a mixture of unknown languages is claimed.
5. The use of one or multiple articulatory class(es) and subclass(es) based representation of speech and text is claimed to search in a speech corpus or running speech containing a mixture of unknown and multiple languages.
6. A method for combining the information in the audio and text version by mathematical operations is claimed where the speech and the text represent the same content.
7. A representation of speech in terms of vowels, place of articulation and manner of articulation is claimed for the use of searching a speech corpus or running speech containing a mixture of unknown and multiple languages.

Some of the non-limiting advantages of the present invention are as follows:
This system does not assume any language identification tags in the speech data or corpus for searching text queries and therefore it can give a better performance where language identification tags of speech data are not given.
Multiple modes of the keyword viz. audio keyword, text keyword or a combined text and audio keyword to be searched are allowed.
Ability to perform well when speech corpus consists of unknown languages.
Searching a keyword in monolingual or multilingual or mixlingual speech corpus or running speech.
Phoneme to articulatory classes based conversion which makes the search process language independent.
Ability to combine the information from audio keywords and text keywords leading to an enhancement in search. The combination of the audio keyword and the corresponding text keyword has higher performance in the non-training languages.
Allows searching of translations of keywords since it is based on unique representation of phonemes of multiple languages.
The system can search translations of the text keyword or translation of synonyms of the text keyword (with the help of standard translation or synonym dictionary) in the speech data. The system also enables search of arbitrary (out of vocabulary) text queries.
This system is based on articulatory classes. This reduces the total dimension of posterior vectors when compared to an analogous phoneme posteriorgrams based approach. An analogous phoneme posteriorgram based system would have to be trained on a superset of phonemes of multiple languages which will make the dimensions of the posterior vectors large.
This system may not require re-configuration if the system is to be adapted with a new training language. This is because articulatory classes and subclasses represent the phonemes of a large number of languages.

Some applications of this invention can be similar but not limited to searching multilingual or monolingual audio news corpus, lectures or telephone conversations. The discerning features of this invention are multiple modes of the keyword viz. audio keyword, text keyword or a combined keyword and its ability to perform well when speech corpus consists of unknown languages.

Although a method, system, and apparatus for searching a keyword belonging to a known or an unknown language in a monolingual or multilingual or mixlingual speech corpus or running speech have been described in language specific to structural features, it is to be understood that the embodiments disclosed in the above section are not necessarily limited to the specific methods or devices described herein. Rather, the specific features are disclosed as examples of implementations of the method and system for searching a keyword belonging to a known or an unknown language in a monolingual or multilingual or mixlingual speech corpus or running speech.

The invention claimed is:
1. A method for performing at least a multilingual keyword data search by using an electronic device, the method comprising steps of:

inputting said multilingual keyword data, wherein said multilingual keyword data includes a plurality of multilingual text keywords;

converting said multilingual text keywords to obtain a plurality of articulatory classes and subclasses information, wherein said electronic device includes a multilingual speech-based storage system having a plurality of records of information associated with said articulatory classes and subclasses, wherein said electronic device is pre-trained on multilingual speech to obtain said plurality of records of information associated with said articulatory classes and subclasses in multilingual speech; and wherein said step of converting comprises:

converting said multilingual text keywords of the said multilingual keyword data into a sequence of multilingual phonemes; thereafter converting said sequence of multilingual phonemes into a sequence of articulatory classes and subclasses; and further converting said sequence of articulatory classes and subclasses into said plurality of articulatory classes and subclasses information in a format that can be matched with the said plurality of records;

matching said plurality of articulatory classes and subclasses information with said plurality of records to obtain a result.

2. The method as claimed in claim 1, wherein said electronic device is selected from a client device or a server device or any combinations thereof.

3. A method for performing at least a multilingual keyword data search by using an electronic device, the method comprising the steps of:

inputting said multilingual keyword data, wherein said multilingual keyword data includes both text and audio versions corresponding to a plurality of multilingual keywords, hereafter referred as multilingual text keywords and multilingual audio keywords respectively;

converting the said multilingual keyword data to obtain a plurality of articulatory classes and subclasses information of said multilingual audio keywords and a plurality of articulatory classes and subclasses information of said multilingual text keywords, wherein said device includes a multilingual speech-based storage system having a plurality of records of information associated with said articulatory classes and subclasses, wherein said electronic device is pre-trained on multilingual speech, to obtain the said plurality of records of information associated with said articulatory classes and subclasses in multilingual speech;

wherein the step of converting said multilingual keyword data to obtain said plurality of articulatory classes and subclasses information of said multilingual audio keywords and said plurality of articulatory classes and subclasses information of said multilingual text keywords, comprises:

converting said multilingual text keywords into a sequence of multilingual phonemes, further; converting said sequence of multilingual phonemes into a sequence of articulatory classes and subclasses, and further converting said sequence of articulatory classes and subclasses into said plurality of articulatory classes and subclasses information in a format that can be matched with the said plurality of records;

converting said multilingual audio keywords to said plurality of articulatory classes and subclasses information by said electronic device pre-trained on multilingual speech to obtain said plurality of articulatory classes and subclasses information in multilingual speech;

combining said plurality of articulatory classes and subclasses information of said multilingual text keywords and said plurality of articulatory classes and subclasses information of said multilingual audio keywords;

and matching said combined plurality of articulatory classes and subclasses information with said plurality of records to obtain a result.

* * * * *